US007658595B2

(12) United States Patent
Podgurski

(10) Patent No.: US 7,658,595 B2
(45) Date of Patent: Feb. 9, 2010

(54) PROTECTIVE BOOT FOR A HELICOPTER PITCH LINK

(75) Inventor: Daniel M. Podgurski, West Chester, PA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 11/372,310

(22) Filed: Mar. 9, 2006

(65) Prior Publication Data

US 2007/0212224 A1   Sep. 13, 2007

(51) Int. Cl.
*B64C 11/32* (2006.01)
*B64C 27/54* (2006.01)

(52) U.S. Cl. .................................. 416/168 R
(58) Field of Classification Search ............ 416/25, 416/26, 98, 103, 104, 168 R, 247 R
See application file for complete search history.

(56) References Cited

U.S. PATENT DOCUMENTS

| | | | | |
|---|---|---|---|---|
| 4,573,693 A | * | 3/1986 | Nakata et al. ............... 277/636 |
| 4,813,913 A | * | 3/1989 | Belter ......................... 464/175 |
| 5,015,215 A | * | 5/1991 | Uchida ....................... 464/175 |
| 5,182,956 A | * | 2/1993 | Woodall et al. .............. 74/18.2 |
| 5,203,522 A | * | 4/1993 | White et al. .............. 244/17.11 |
| 5,222,746 A | * | 6/1993 | Van Steenbrugge ......... 277/630 |
| 6,764,243 B1 | * | 7/2004 | Inuzuka et al. ................ 403/50 |
| 7,293,963 B2 | * | 11/2007 | Ozelski et al. .............. 416/209 |
| 2003/0057652 A1 | * | 3/2003 | Martin ........................ 277/391 |

* cited by examiner

*Primary Examiner*—Edward Look
*Assistant Examiner*—Nathaniel Wiehe
(74) *Attorney, Agent, or Firm*—Hope Baldauff Hartman, LLC

(57) ABSTRACT

A protective boot for a helicopter blade pitch link assembly as described herein includes a split joint that allows for easy removal and replacement of the protective boot. The protective boot is less expensive to replace, requires less manpower, and eliminates the need for post-maintenance test flights, which might otherwise be necessary to confirm proper alignment and installation of the pitch link assemblies.

21 Claims, 5 Drawing Sheets

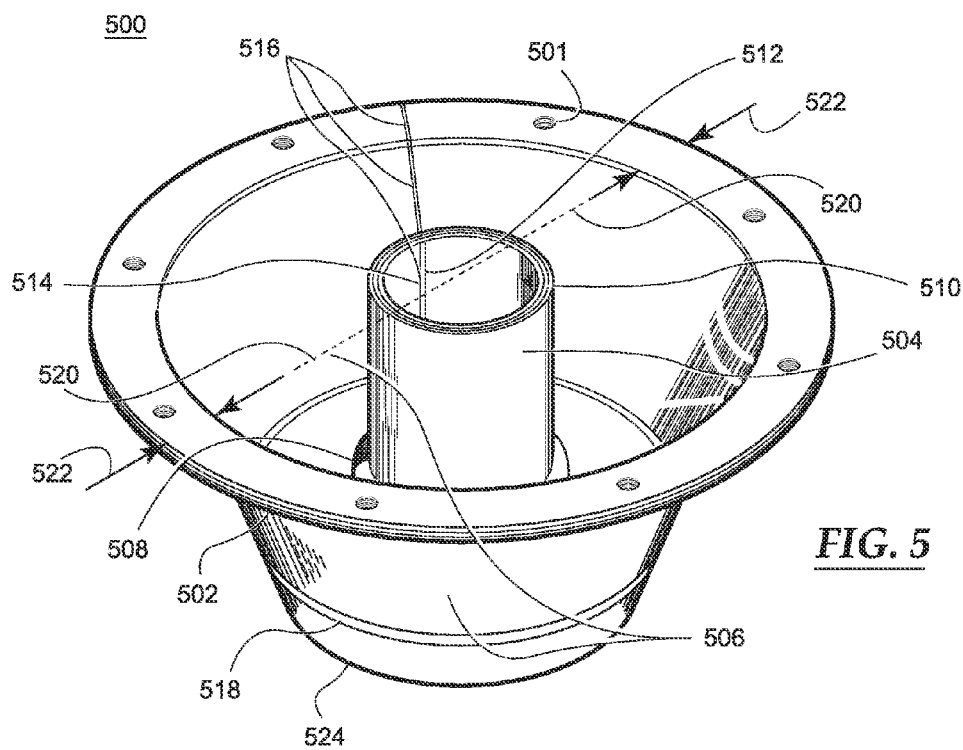
FIG. 5
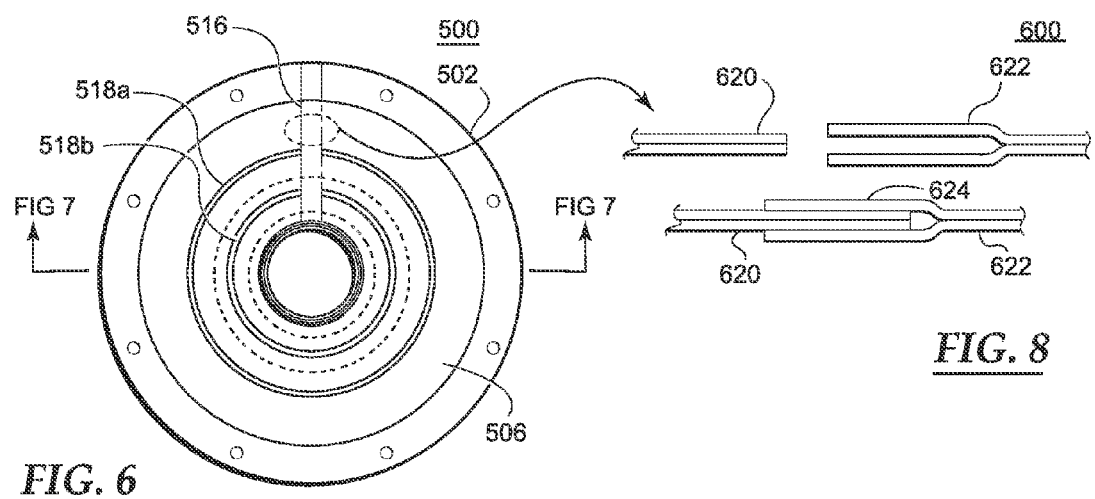
FIG. 6
FIG. 8
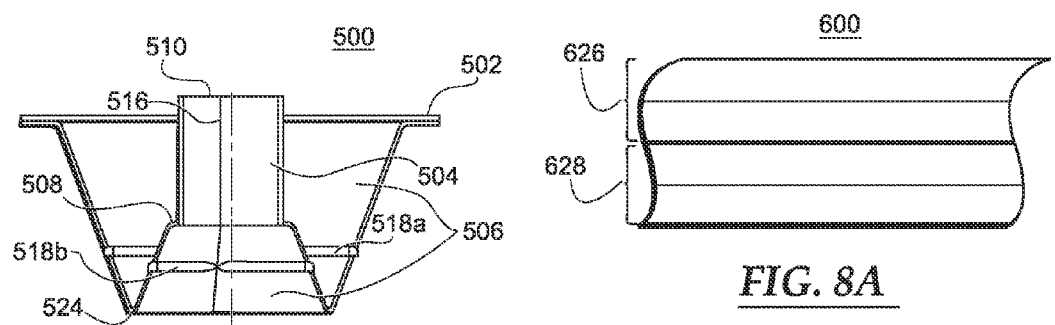
FIG. 7
FIG. 8A

PROTECTIVE BOOT FOR A HELICOPTER PITCH LINK

TECHNICAL FIELD

The present invention relates generally to helicopter components. More particularly, the present invention relates to a weather protective boot for a helicopter blade pitch link assembly.

BACKGROUND

The pitch links of most helicopters include length adjusters that are centrally located between the ends of the pitch links. These length adjusters can be manipulated to ensure that all of the pitch links on the helicopter are of a similar length, which results in proper in-flight operation, reduce vibration, and enhance rotor performance. Some helicopters include shields, guards, covers, or other equipment that protect the upper control mechanism from rain, snow, and other weather elements.

FIG. 1 is a perspective view of an existing portion of a helicopter 100, including two blades 102, an upper control mechanism 104, and two pitch link assemblies 106. In operation, upper control mechanism 104 (which rotates along with blades 102) actuates pitch link assemblies 106 to adjust the pitch of blades 102. In this regard, upper control mechanism 104 generally raises or lowers pitch link assemblies 106 to cause blades 102 to rotate about their respective longitudinal axes. The arrows 108 in FIG. 1 indicate the rotation of blades 102 about their longitudinal axes.

FIG. 2 is a partial cross sectional view of an existing helicopter blade pitch link assembly and protective boot. FIG. 2 includes a schematic partial cross sectional view of a helicopter 200 having an upper control mechanism 202, a pitch link assembly 204, a canopy 206, and a protective boot 208. The protective boot 208 is formed from a flexible material that enables the upper control mechanism 202 to raise and lower the pitch link assembly 204 without breaking the weather "seal." In FIG. 2, the protective boot 208 has a lower section 210 that resembles an accordion and an upper section 212 that resembles a sleeve. Lower section 210 is secured to the center of the pitch link assembly 204 using string or laces 214, while upper section 212 is secured near the upper end of pitch link assembly 204 using string or laces 216. These laces 216 are concentrated about the upper end of the tube-shaped portion of protective boot 208. As depicted in FIG. 2, upper section 212 of protective boot 208 covers most of the portion of pitch link assembly 204 located above canopy 206. Pitch link assembly 204 includes an adjustment mechanism 218 that is located under canopy 206 and, consequently, under protective boot 208. To adjust the length of pitch link assembly 204, protective boot 208 must be untied, removed, or disassembled to provide access to the adjustment mechanism 218 of pitch link 204.

FIG. 3 is a top view of a portion of an existing helicopter 300 with the blade 302 slightly misaligned with its pitch axis. For simplicity, only one blade 302 is shown attached to the rotor. As shown in FIG. 3, helicopter 300 accommodates three blades and three respective pitch link assemblies 304 protruding through a canopy 306. Canopy 306 is a rigid cover that extends over the upper control mechanism for the helicopter 300, thus protecting the upper control mechanism from the elements. Canopy 306 includes holes 310 formed therein; the pitch link assemblies 304 protrude through these holes 310. Protective boots 308 encircle the pitch link assemblies 304, and span the spaces between the pitch link assemblies 304 and canopy 306. In other words, protective boots 308 fill the gaps created by the holes 310 that receive the pitch link assemblies 304.

As evidenced by FIG. 2 and FIG. 3, it can be difficult to replace a worn protective boot in the field because the respective pitch link assembly must be fully or partially removed from the upper control or otherwise disassembled to enable a technician to slide the new protective boot over the pitch link assembly.

FIG. 4 is a perspective view of an existing helicopter blade pitch link assembly protective boot 400. This protective boot 400 includes a zipper 402 that partially extends along a sleeve section 404. The upper end 406 and the lower end 408 of protective boot 400 are continuous, i.e., they are not designed to be separable. Accordingly, to replace the protective boot 400, a technician must disconnect the pitch link from the control arm, remove the pitch link assembly entirely out of the protective boot 400, install a new protective boot, and replace the pitch link assembly onto the control arm. Whenever the pitch link assembly is removed in this fashion it requires a post-maintenance test flight to insure that nothing has changed on the helicopter. Such maintenance and testing can be very time consuming, labor intensive, and expensive.

It is desirable to design a new pitch link assembly protective boot that can be easily installed in the field without the need to remove or unlink the pitch link assembly, which also eliminates the need for a post-maintenance test flight. Furthermore, other desirable features and characteristics of the present invention will become apparent from the subsequent detailed description and the appended claims, taken in conjunction with the accompanying drawings and the foregoing technical field and background.

BRIEF SUMMARY

A split protective boot for a helicopter pitch link assembly as described in more detail herein enables relatively quick and easy replacement procedures. A split protective boot configured in accordance with an example embodiment of the invention can be installed in the field without the need to remove the pitch link assembly from the helicopter blade or the helicopter control mechanism. The split protective boot can eliminate the need for a post-maintenance test flight. In an example embodiment of the invention, the split protective boot is realized as a split component that can be assembled and sealed around the pitch link assembly. When it is time to replace the split protective boot, it may be cut out with a knife or a pair of scissors, discarded, and replaced with another split protective boot. In doing so, there is no need to remove and replace the pitch link assembly itself.

The above and other aspects of the invention may be carried out in one form by a split protective boot for a helicopter blade pitch link assembly. The split protective boot includes a flange configured for attachment to a helicopter upper control weather cover, an attachment section having an upper end and a lower end configured to cover and connect to the pitch link assembly, a flexible body coupled between the flange and the lower end of the attachment section, and a split joint extending from the flange through the flexible body to the upper end of the attachment section.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 5 is an isometric view of a split protective boot according to an example embodiment of the invention;

FIG. 6 is a top view of the split protective boot shown in FIG. 5;

FIG. 7 is a cross sectional view of the split protective boot shown in FIG. 5, taken along the line FIG. 7-FIG. 7 in FIG. 6;

FIG. 8 is a detailed cross sectional view of an example tongue and groove split joint that is suitable for use with the split protective boot shown in FIG. 5;

FIG. 8A is a cross section of a double layer composite material for a sleeve according to an example embodiment of the invention;

DETAILED DESCRIPTION

Figure 1:
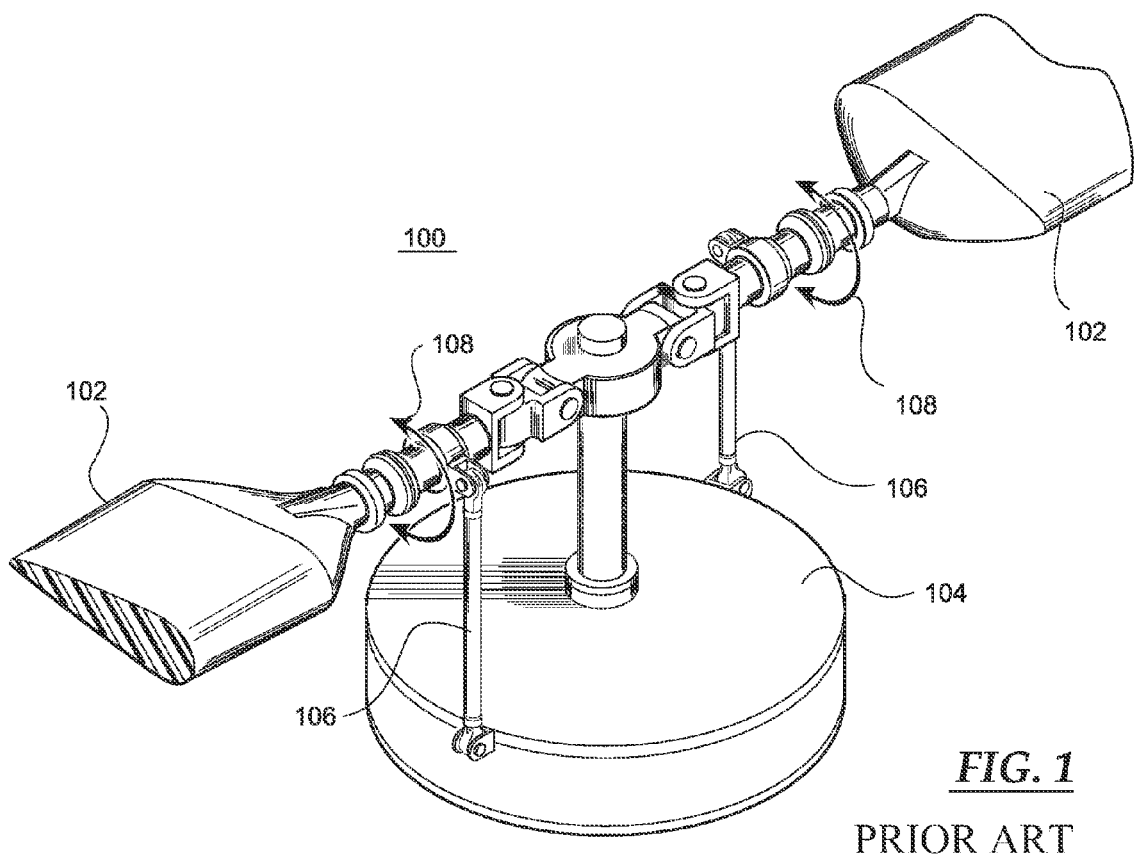
FIG. 1 is a perspective view of a portion of a helicopter.
Figure 2:
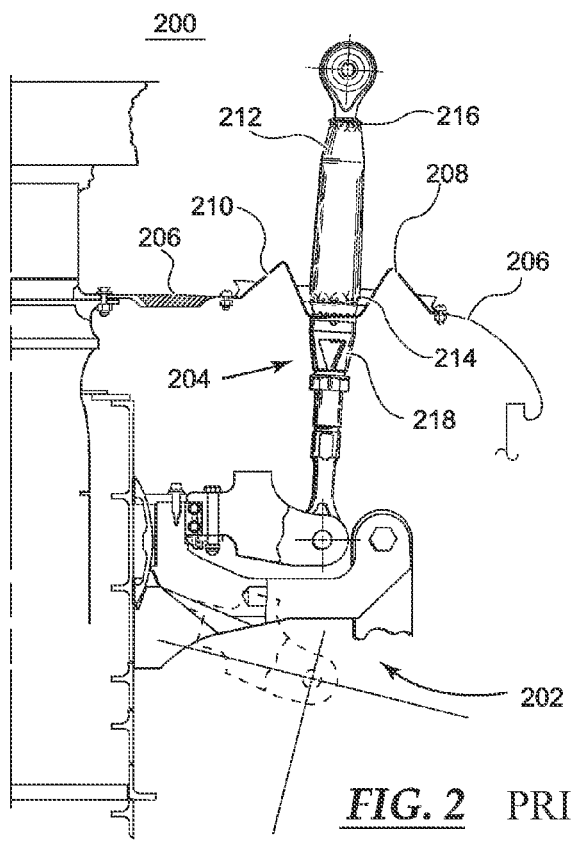
FIG. 2 is a partial cross sectional view of a helicopter blade pitch link assembly and protective boot.
Figure 3:
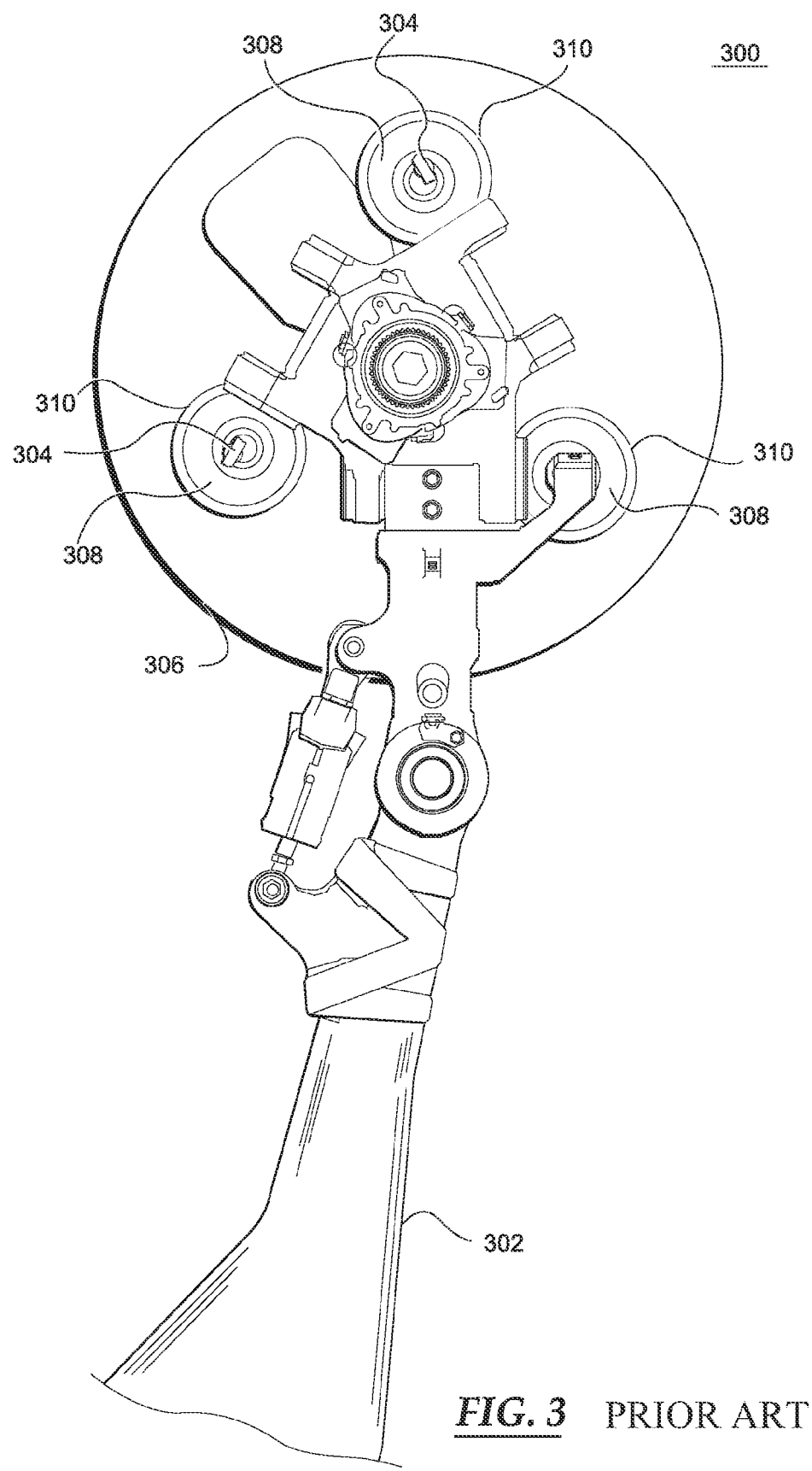
FIG. 3 is a top view of a portion of a helicopter with a rotor blade slightly misaligned with its pitch axis.
Figure 4:
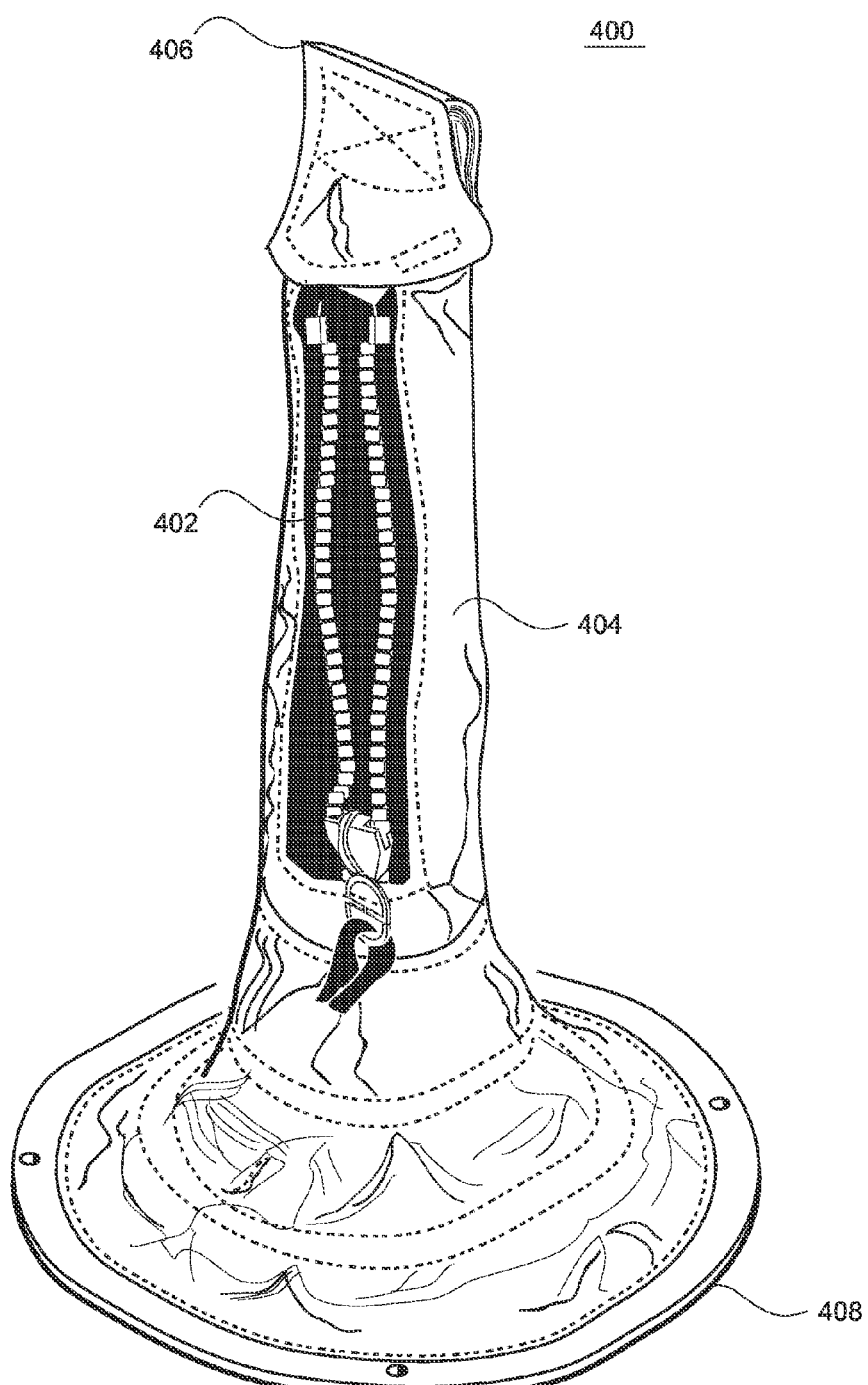
FIG. 4 is a perspective view of a protective boot for a helicopter blade pitch link assembly.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

For the sake of brevity, conventional aspects and features of helicopters and helicopter control systems may not be described in detail herein. Furthermore, the example embodiments of the invention described herein may be deployed in helicopters having designs that differ from that shown in the figures. In this regard, the inventive concepts can be implemented in the context of different practical helicopter designs, and the particular helicopter assemblies shown and described herein are not intended to limit the scope or applicability of the invention in any way.

The following description may refer to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

The following description may use descriptive terms such as "upper" and "lower" to refer to the relative positioning of elements or features. Unless otherwise noted, the use of such terms is not intended to limit the scope or application of the invention. Rather, such terms may be used for consistency with the figures and for ease of description.

FIG. 5 is an isometric view of a split protective boot 500 configured in accordance with an example embodiment of the invention, FIG. 6 is a top view of split protective boot 500, and FIG. 7 is a cross sectional view of split protective boot 500 as viewed along the line FIG. 7-FIG. 7 shown in FIG. 6. The split protective boot 500 generally includes a flange 502, an attachment section 504, and a flexible body 506 coupled between the flange 502 and the attachment section 504. In this example embodiment, flange 502, attachment section 504, and flexible body 506 are connected to one another, forming a sleeve for at least partially covering a pitch link assembly. In practice, split protective boot 500 may be configured such that flange 502, attachment section 504, and flexible body 506 are continuous, forming a weatherproof cover for at least a portion of the pitch link assembly, which in turn protects the upper control mechanism of the helicopter. As described in more detail below, split protective boot 500 preferably includes a split joint 516 that forms a weatherproof seam when split protective boot 500 is installed onto the respective helicopter blade pitch link assembly.

Figure 9:
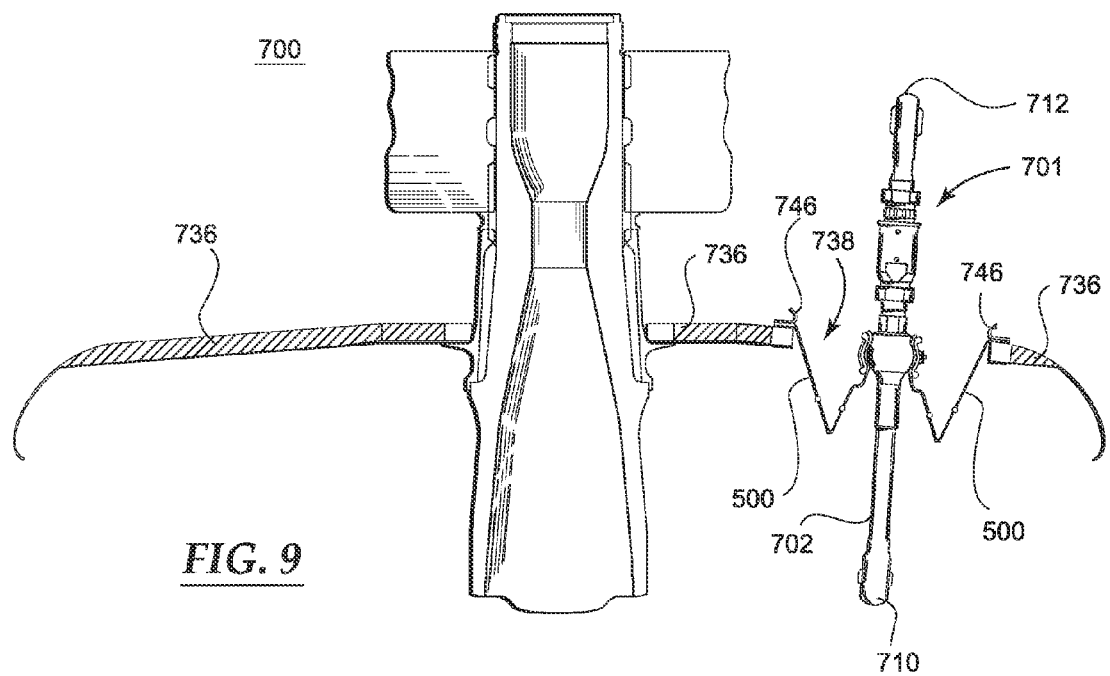
FIG. 9 is a partial cross sectional view of a portion of a helicopter, showing an example installation of a split protective boot of the type shown in FIG. 5.
Figure 10:
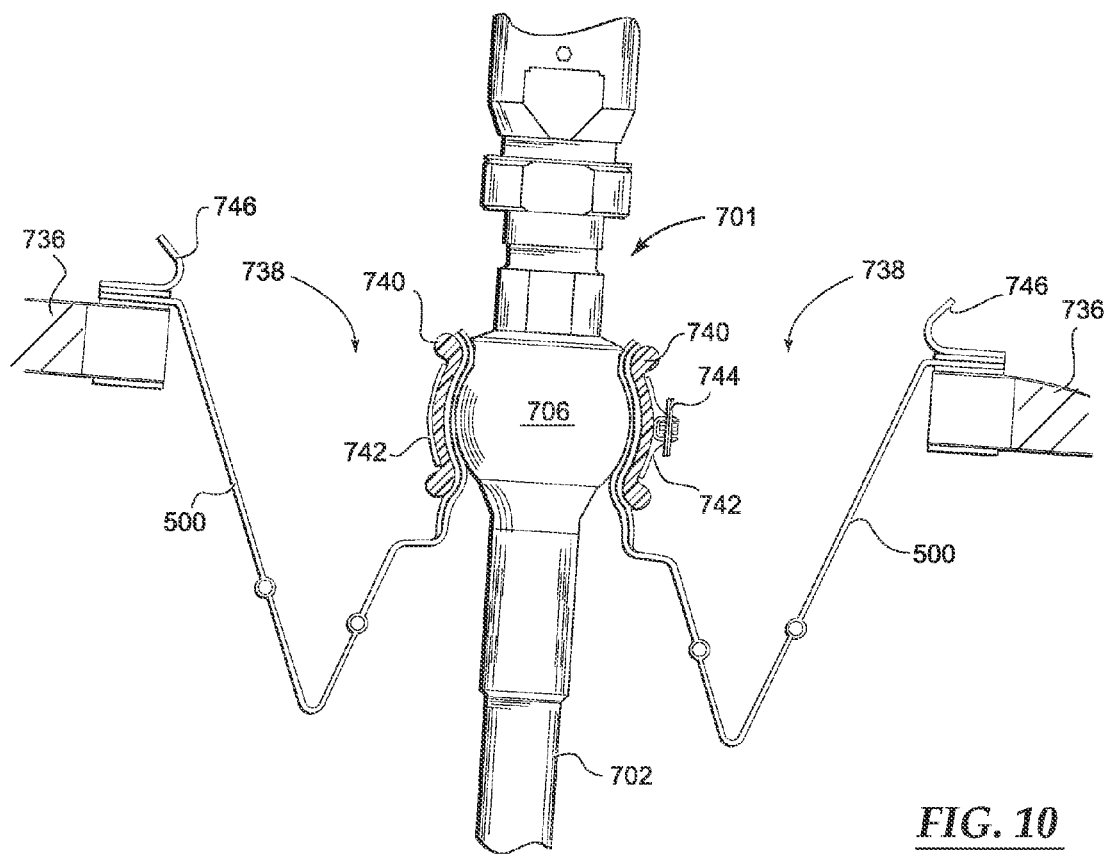
FIG. 10 is a partial cross sectional view of a pitch link assembly and a split protective boot of the type shown in FIG. 5.

Flange 502 is configured for attachment to a helicopter upper control weather cover canopy (as shown in FIG. 9 and FIG. 10). The flange 502 may provide a solid base for coupling of the flexible body 506 to the canopy. In one example embodiment of this invention (see FIG. 5), the flange 502 may be a circular annulus (ring shape) with an inner circle diameter 520 of approximately 7.94 inches where it couples to the flexible body 506 and with an outer circle diameter 522 of approximately 9.75 inches where it attaches to the helicopter upper control weather cover canopy. The flange 502 may be approximately 0.91 inches wide. The width of the flange is approximately half the difference between the inner circle diameter 520 and the outer circle diameter 522. The flange 502 may contain holes 501 for secure attachment (for example riveting or bolting) to the canopy. These dimensions merely reflect one example embodiment, and flange 502 may be alternatively dimensioned to suit the needs of the particular helicopter design, pitch link design, or other functional requirements.

In the example embodiment, the flange 502 is constructed as a multi-layered element. Each layer of the flange 502 may be formed from any suitable material, such as, for example, nylon, Kevlar, rubber, or any composite thereof. In one example embodiment of this invention, the flange 502 is made from three layers of material (see FIG. 5), where each layer of material is approximately 0.06 inches thick. In practice, one of these layers may also represent a layer of flexible body 506 (see FIG. 7). In one example embodiment of this invention (see FIG. 7), the attachment section 504 may be tube shaped with an upper end 510 and a lower end 508, and attachment section 504 may be suitably configured to attach to one or more features of the pitch link assembly. In this example, the upper end 510 corresponds to the upper end of the sleeve that forms split protective boot 500, and the lower end 508 may be coupled to the flexible body 506. The tubular interior of the attachment section 504 may have an internal diameter of approximately 2.12 inches, although other dimensions may be employed to suit the needs of the specific deployment. The split protective boot 500 may also utilize a clamping mechanism configured to secure the split protective boot (and, more particularly, the attachment section 504) to the pitch link assembly. The clamping mechanism will be discussed in detail below.

The attachment section 504 may be formed from any suitable material, such as, for example, nylon, Kevlar, rubber, or any composite thereof. In one example embodiment, the attachment section 504 is made from multiple layers of double layer material (see FIG. 5), where each layer of the double material is approximately 0.06 inches thick. Of course, the thickness may vary to suit the needs of the particular application, and more than two layers of double layer material may be utilized in other example embodiments.

In one example embodiment of this invention, flexible body 506 is coupled between flange 502 and lower end 508 of attachment section 504. The flexible body 506 may be accordion shaped in its nominal unbiased state (see FIG. 7). The accordion shape may descend from the flange 502 as an outer conical section to a hinging inflection circle 524. From the hinging inflection circle 524, an inner conical section may rise to meet the lower end 508 of attachment section 504. The accordion shape of the flexible body 506 accommodates up and down movement of the pitch link assembly when split protective boot 500 is installed on the pitch link assembly. The diameter of the flexible body 506 may be approximately 7.94 inches where it is coupled to the flange 502 and may be approximately 2.71 inches where it is coupled to the lower end 508 of the attachment section 504. These dimensions are merely indicative of one particular embodiment, and other dimensions may be employed depending upon the practical deployment and model of helicopter.

The flexible body 506 may be formed from one double layer (see FIG. 7) or more double layers of any suitable material, such as nylon, Kevlar, rubber, or any composite thereof. In one example embodiment, the flexible body 506 is approximately 0.06 inches thick.

The split protective boot 500 may also include one or more suitably configured reinforcement rings 518a and 518b coupled to the flexible body 506. As shown in FIG. 7, one reinforcement ring 518a may be located around the outer conical section of flexible body 506, and a second reinforcement ring 518b may be located around the inner conical section of flexible body 506. The reinforcement rings 518a and 518b may be sewn into the flexible body 506 to provide stiffness to insure that the conical shape of 506 is maintained. Alternatively, reinforcement rings 518a and 518b may be integrated into flexible body 506 or otherwise attached to flexible body 506 using an adhesive, fasteners, or the like. In practical embodiments, the reinforcement rings 518a and 518b can be formed from a solid nylon material. In one example embodiment of this invention (see FIG. 7), the reinforcement rings 518a and 518b are circular in shape and are approximately 0.14 inches thick in cross section diameter. Notably, the split joint 516 is also formed in the reinforcement rings 518 as it extends from the flange 502 through the flexible body 506 and to the upper end 510 of the attachment section 504.

In this embodiment, the split joint 516 extends from the flange 502 through the flexible body 506 to the upper end 510 of the attachment section 504. FIG. 8 is a detailed top view of an example tongue and groove split joint 600 that is suitable for use with the split protective boot 500. In this regard, tongue and groove split joint 600 represents one possible implementation of split joint 516, described above. Split joint 600 is suitably configured to form a structural and weatherproof seam 624 for split protective boot 500. Referring to both FIG. 8 and FIG. 5, a tongue member 620 of split joint 600 may be formed in (or attached to) one edge 512/514 (see FIG. 5) of the sleeve, and a groove member 622 of split joint 600 may be formed in (or attached to) the other edge 514/512 of the sleeve. In this example, the edges 512/514 run between the ends of the sleeve. In other words, prior to installation of split protective boot 500, the edges 512/514 correspond to the longitudinal edges of the sleeve that will ultimately mate together to form a seam. In one example embodiment, the tongue member 620 may be approximately 0.06 inches thick and the overlapping seam 624 may be approximately 0.5 inches wide. The tongue member 620 and the groove member 622 may each be formed from a composite material such as nylon, Kevlar, rubber, any composite thereof, or from any suitable material or composition.

After the split protective boot is wrapped around the pitch link assembly, the tongue member 620 (see FIG. 8) can be inserted into the groove member 622 (see FIG. 8) and a seam can be formed using an adhesive material such as a rubber based adhesive. Alternatively, a seam can be formed using Velcro material with waterproof adhesive, a double latch fastener, or other resealable or non-resealable fastener. In this embodiment, the tongue member 620 and the groove member 622 are bonded and sealed together to form the weatherproof seam 624.

In this example embodiment of the invention, the sleeve may be formed from any suitable double layer composite material, such as, for example, nylon, Kevlar, rubber, or any composite material thereof. FIG. 8A shows a cross section of a double layer composite material 600 for the sleeve according to an example embodiment of the invention. As shown in FIG. 8A, the sleeve is made from a first double layer 626 of composite material and a second double layer 628 of composite material, where each layer of the double layer composite material is approximately 0.06 inches thick. Of course, the thickness may vary to suit the needs of the particular application, and more than two double layers of composite material may be utilized in other example embodiments.

It should be appreciated that other split joint configurations can be equivalently employed in the context of split protective boot 500, and that the arrangement shown in FIG. 8 is not intended to limit or restrict the scope or application of the invention in any way. Other suitable configurations for the split joint include, without limitation: a lap joint bonded with rubber adhesive, a lap or tongue and groove joint made with rivets and sealant, and a vulcanized joint made with the aid of a self vulcanizing material or vulcanizing tool.

A split protective boot as described herein enables relatively quick and easy replacement procedures, and can be installed in the field without the need to remove, disassemble, and replace the respective pitch link assembly. For installation, the split nature of split protective boot 500 allows a technician to easily wrap the sleeve around the pitch link assembly. Once in place, the sleeve is assembled by sealing split joint 516 using any appropriate technique. FIG. 9 is a partial cross sectional view of a portion of a helicopter 700, showing an example installation of split protective boot 500 of the type shown in FIG. 5. FIG. 10 is a partial cross sectional view of a pitch link assembly 701 and split protective boot 500 of the type shown in FIG. 5. Split joint 516 is not depicted in FIG. 9 or FIG. 10 due to the cross sectional nature of the respective views.

For clarity, the helicopter blade and pitch control mechanism are not depicted in FIG. 9. This helicopter subassembly includes a split protective boot 500 coupled to pitch link assembly 701. More specifically, split protective boot 500 is coupled to a lower link member 702 at a split protective boot interface feature 706 shown in FIG. 10. Split protective boot 500 may be formed from any suitable material that is flexible and resilient, for example, Kevlar, rubber, nylon, or any composite thereof. In this example, split protective boot 500 is double layered at the section that slides over pitch link assembly 701, as shown in FIG. 10. This double layering reinforces split protective boot 500 where it is clamped to pitch link assembly 701.

FIG. 10 depicts one suitable arrangement for coupling split protective boot 500 to split protective boot interface feature 706. In this example, split protective boot 500 is positioned over pitch link assembly 701 such that the attachment section of split protective boot 500 is located at split protective boot interface feature 706. Then, a split collar 740 formed of plastic, composite material, pliable metal, or any suitable material is placed around split protective boot interface feature 706. As shown in FIG. 10, collar 740 may be contoured to better mate with split protective boot interface feature 706. Once collar 740 is in place, a clamping mechanism or clamp 742 is installed around collar 740. Clamp 742 may include a lever actuator 744, a threaded tightening mechanism, or other securing feature that is configured to secure split protective boot 500 around split protective boot interface feature 706. In practical embodiments, clamp 742 may be held in position using a cotter pin or any appropriate locking element.

The helicopter subassembly in FIGS. 9 and 10 includes a canopy 736 that is configured to cover the pitch control mechanism for the helicopter. Canopy 736 may be formed from a rigid, light and weatherproof material such as fiberglass, aluminum, carbon fiber and a NOMEX or aluminum honeycomb core, or the like. Canopy 736 includes a hole 738 formed therein for each pitch link assembly as shown in FIG. 9. Also shown in FIG. 9, hole 738 receives pitch link assembly 701 such that an end 710 is located below canopy 736 and such that an end 712 is located above canopy 736. Split protective boot 500 may also be coupled to canopy 736 such that split protective boot 500 spans the space between pitch link assembly 701 and canopy 736. In this example, flange 502 of split protective boot 500 overlaps canopy 736, and flange 502 is secured to canopy 736 via a ring element 746 (depicted in cross section in FIG. 9 and FIG. 10) that is riveted, bolted, or otherwise secured to canopy 736.

Since split protective boot 500 is designed to be a sacrificial part, when it is time for replacement, the split protective boot may be cut out with a knife or a pair of scissors (flange 502 and collar 744 may require tools for removal) and replaced with another split protective boot. This will reduce the likelihood of damage or adjustment alteration to the pitch link assembly 701 during boot replacement. Split protective boot 500 represents an improvement over conventional boots because it eliminates a number of time consuming and labor intensive steps that are currently required during field replacement of such conventional boots. Consequently, in practice, use of split protective boot 500 is less expensive, requires less manpower, and eliminates the need for a post-maintenance test flight which might otherwise be necessary to insure proper alignment and installation of the pitch link assemblies as described in the background section.

What is claimed is:

1. A helicopter blade pitch link assembly protective boot comprising:
    a flange configured for attachment to a helicopter upper control weather cover;
    an attachment section having an upper end and a lower end, the attachment section being configured to connect to the pitch link assembly;
    a flexible body coupled between the flange and the lower end of the attachment section, wherein the flexible body is configured to descend from the flange to a hinging inflection circle to form an outer conical section and rise from the inflection circle to the lower end of the attachment section to form an inner conical section; and
    a split joint extending from the flange, through the flexible body, and to the upper end of the attachment section,
    wherein the flange, attachment section, and flexible body are configured such that when installed, the upper end of the attachment section and the flange are positioned substantially within a plane that comprises a top surface of the upper control weather cover, and the lower end of the attachment section and the flexible body are positioned below the plane that comprises the top surface of the upper control weather cover.

2. A protective boot according to claim 1, wherein the flange is formed from three double layers of material.

3. A protective boot according to claim 1, wherein the attachment section is formed from two double layers of material.

4. A protective boot according to claim 1, wherein the flexible body is formed from a single double layer of material.

5. A protective boot according to claim 4, further comprising two reinforcement rings coupled to the flexible body.

6. A protective boot according to claim 5, wherein each reinforcement ring is sewn into the flexible body.

7. A protective boot according to claim 1, wherein the split joint comprises a double latch fastener.

8. A protective boot according to claim 1, further comprising an adhesive material that bonds the split joint.

9. A protective boot according to claim 8, wherein the adhesive material is a rubber based adhesive.

10. A protective boot according to claim 1, further comprising a clamping mechanism configured to secure the protective boot to the pitch link assembly.

11. A helicopter blade pitch link assembly protective boot comprising:
    a flange configured for attachment to a helicopter upper control weather cover;
    a sleeve for attachment to a pitch link assembly, the sleeve configured with an upper end that is substantially within a plane defined by the flange when the sleeve is attached to the pitch link assembly and extends downward to a lower end that is flexibly attached to the flange; and
    a split joint extending from the flange through the lower end to the upper end.

12. A protective boot according to claim 11, wherein the sleeve comprises two double layers composite material.

13. A protective boot according to claim 12, wherein the double layer composite material comprises nylon and rubber.

14. A protective boot according to claim 12, wherein the double layer composite material comprises a para-aramid synthetic fiber and rubber.

15. A protective boot according to claim 11, wherein the split joint comprises a double latch fastener.

16. A protective boot according to claim 11, further comprising a clamping mechanism configured to secure the sleeve to the pitch link assembly.

17. A helicopter blade pitch link assembly protective boot comprising:
    a sleeve having a tube shaped attachment section with an upper end that is positioned proximate to a plane defined by a flange when the sleeve is attached to a pitch link assembly and extends downward to a lower end, comprising a flexible material that is configured to deform such that the tube shaped attachment section nests with a protective boot interface feature of the pitch link assembly when clamped on the pitch link assembly with a split collar,
    wherein the sleeve comprises a first edge and a second edge disposed between the upper end and the lower end and configured to mate with one another to form a seam, and
    wherein the sleeve is configured to descend from the flange to a hinging inflection circle to form an outer conical section and rise from the inflection circle to the lower end of the attachment section to form an inner conical section; and
    the split collar contoured to mate with the protective boot interface feature of the pitch link assembly and configured to secure the tube shaped attachment section between the split collar and the protective boot interface feature when clamped around the tube shaped attachment section.

18. A protective boot according to claim 17, wherein the weatherproof seam comprises:
   a tongue member attached to the first edge; and
   a groove member attached to the second edge.

19. A protective boot according to claim 18, wherein the tongue member and the groove member are each formed from a composite material.

20. A protective boot according to claim 18, further comprising an adhesive material that bonds the first and second edges together to form the weatherproof seam.

21. A protective boot according to claim 20, wherein the adhesive material is a rubber based adhesive.

* * * * *